United States Patent

[11] 3,619,811

| [72] | Inventors | Donald B. Kaiser;<br>John A. Powell, both of Lancaster, Pa. |
|---|---|---|
| [21] | Appl. No. | 768,409 |
| [22] | Filed | Oct. 17, 1968 |
| [45] | Patented | Nov. 9, 1971 |
| [73] | Assignee | RCA Corporation |

[54] GAS LASER TUBE MOUNT
5 Claims, 3 Drawing Figs.

[52] U.S. Cl. .................................................. 331/94.5, 313/50
[51] Int. Cl. .................................................. H01s 3/02
[50] Field of Search .................................................. 331/94.5; 315/8; 313/50, 269

[56] References Cited
UNITED STATES PATENTS
3,434,776  3/1969  Kern ............................. 331/94.5
2,497,078  2/1950  Gall .............................. 313/50
3,431,454  3/1969  Sanders ......................... 315/8

*Primary Examiner*—Roy Lake
*Assistant Examiner*—Darwin R. Hostetter
*Attorney*—Edward J. Norton

ABSTRACT: A gas laser tube has an an integral part thereof mounting means including a rigid girdling member disposed intermediate the ends of the tube, which girdling member circumferentially surrounds the envelope of the tube. This girdling member is in its entirety spaced from the envelope by a plurality of circumferentially spaced pads of a resilient adherent material, such as silicone rubber, which bonds and mechanically couples the girdling member to the envelope. This permits a prealigned gas laser to be shipped without loss of alignment due to vibration of the laser tube during shipping. It also protects the frangible envelope of the laser tube from breakage.

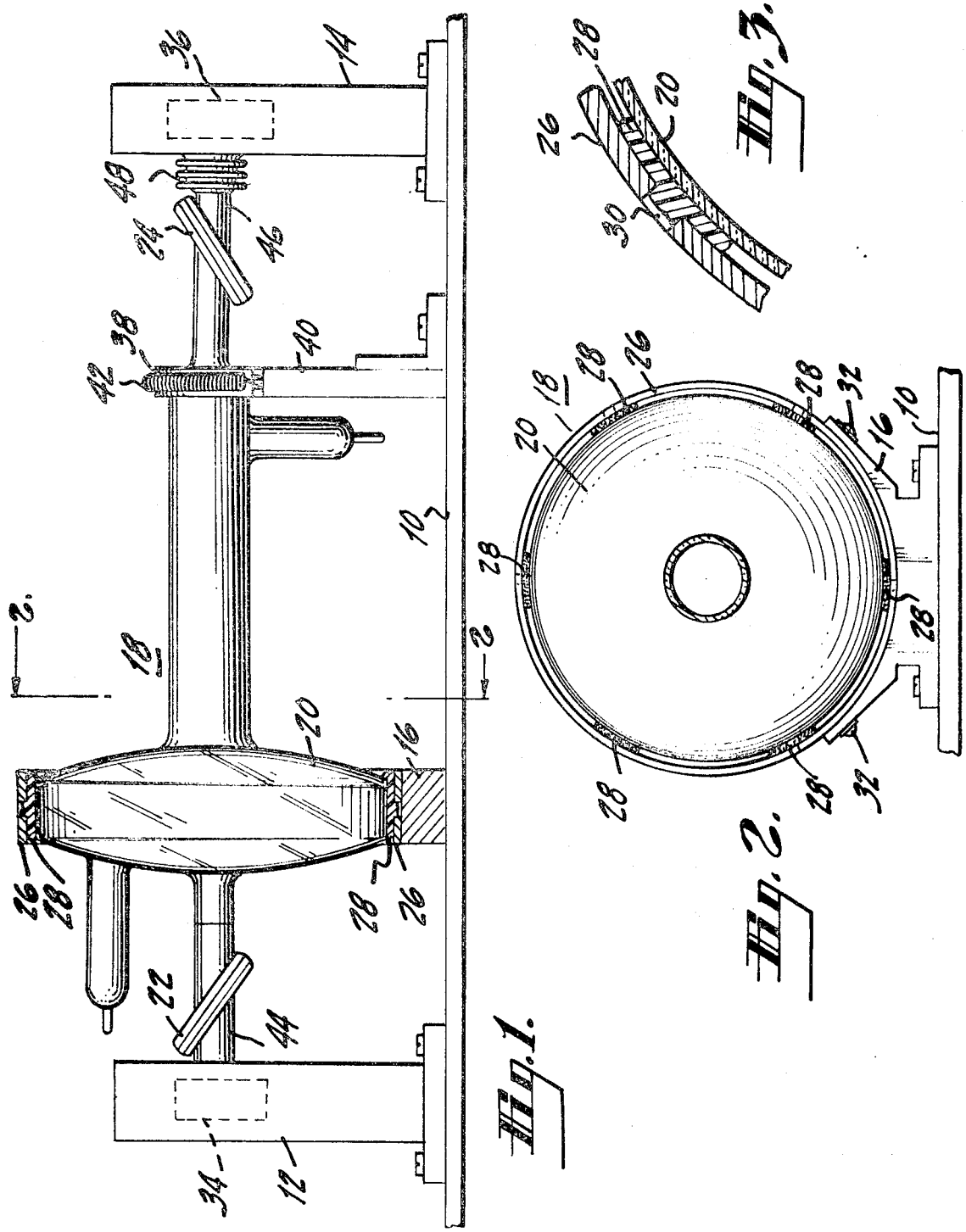

GAS LASER TUBE MOUNT

This invention relates to gas lasers, and, more particularly to improved mounting means for gas laser tubes.

The usual gas laser comprises a gas discharge laser tube within an optical resonant cavity. The tube consists of an evacuated envelope, which is normally fabricated of a frangible material, such as glass, quartz or ceramic, filled with one or more gases, such as carbon dioxide, argon, helium-neon, etc., at a low pressure of a few torrs or less. The optical resonant cavity is defined by a pair of external longitudinally spaced mirrors facing each other and having a predetermined orientation with respect to each other. A gas discharge laser tube, which is situated in between the two mirrors, is terminated at one end thereof in a Brewster angle window which is located in cooperative relationship with one of the mirrors and is terminated at the other end thereof in another Brewster angle window which is located in cooperative relationship with the other of the mirrors. For lasing to occur it is necessary to establish a gas discharge plasma within the gas discharge laser tube. However, this in itself is not enough. It is also required that the gas discharge laser tube, i.e., the Brewster angle windows at the opposite ends thereof, be precisely aligned with respect to the predetermined position of the pair of external mirrors forming the optical resonant cavity.

Although the present invention is particularly suitable for use with a gas laser employing external mirrors, it is also of advantage with gas laser tubes employing attached internal mirrors at opposite ends thereof and with gas laser amplifiers not employing mirrors. In these cases, the laser mount of this invention not only protects the frangible envelope from breakage and provides simple means for attaching the laser tube to support means, but maintains the alignment of the tube and/or light output thereof with respect to other apparatus external to a but in cooperative relationship with the laser tube.

It is therefore an object of the present invention to provide an improved mount for gas discharge laser tubes.

Briefly, the gas laser tube includes as an integral part thereof a rigid girdling member disposed intermediate the ends of the tube, which girdling member circumferentially surrounds the envelope and is in its entirety spaced from the envelope. Further a resilient adherent material bonds and mechanically couples the girdling member to the envelope to provide in the absence of external stress a certain fixed equilibrium position of the envelope with respect to the girdling member and in the presence of external stress a deviation of the position of the envelope from the certain fixed equilibrium position which depends upon the direction and magnitude of the external stress.

This and other objects, features and advantages of the present invention will become apparent from the following detailed description taken together with the accompanying drawings, in which:

FIG. 1 shows a side view of a typical gas laser employing the present invention;

FIG. 2 shows a cross secton of the gas laser of FIG. 1; and

FIG. 3 is a magnified cross-sectional view showing the configuration of one of the pads bonding and mechanically coupling the girdling member to the envelope of the gas laser tube of FIGS. 1 and 2.

Referring now to FIGS. 1 and 2, the gas laser assembly comprises base member 10 having secured thereto toward one end thereof first mirror mount member 12 and having secured thereto toward the other end thereof second mirror mount member 14. Secured to base member 10 intermediate first and second mirror mount members 12 and 14 is laser tube mount support member 16.

Gas laser tube 18 itself comprises a gas-filled envelope 20 made of a frangible material, such as glass, fused quartz or ceramic, which is terminated at one end thereof in first Brewster angle window 22 and is terminated at the other end thereof in second Brewster angle window 24.

Tube 18 includes as an integral part thereof rigid girdling member 26, which may be a metallic ring. Girdling member 26 circumferentially surrounds envelope 20 and is in its entirety spaced from envelope 20. Girdling member 26 is bonded and mechanically coupled to envelope 20 by the six pads 28 which are equally spaced about the circumference of envelope 20, as shown in FIG. 2.

Each of these pads 28 is composed of a curable compound which is a liquid in its uncured state and a solid in its cured state. Further, this curable material is an adherent material which in its cured state is very resilient. The so-called "Silastic" silicone rubber compounds made by Dow Corning or equivalent compounds made by others are good examples of such a material. For instance, Dow Corning 732RTV silicone rubber compound can be applied and cured at room temperature, will withstand elevated temperatures, remains "rubbery," and bonds readily to quartz, glass and metal surfaces. Further the elastic properties of the material provide excellent shock mounting of the tube and compensate for the slight dimensional changes associated with thermal expansion.

The structural cooperation between envelope 20, girdling member 26 and each of pads 28 is shown in detail in FIG. 3. In particular, girdling member 26 is provided with its own individual hole 30 therethrough for each one of the plurality of pads 28. Each of the several radial holes 30 allow extrusion of the uncured silicone rubber compound into the cavity between girdling member 26 and envelope 20. THe uncured silicone rubber compound is injected through the hole and, upon striking the surface of envelope 20, flows outward to form a circular pad of silicone rubber compound which, after being cured, forms a bond and mechanical coupling between envelope 20 and girdling member 26. The number of pads and the thickness and area of each pad determines the rigidity of the finished mounting. After curing of the silicone rubber compound, in the absence of external stress, envelope 20 has a certain fixed equilibrium position with respect to the girdling member. Although in the presence of external stress the position of the envelope is deviated from this certain fixed equilibrium position in a direction and by an amount which depends upon the direction and magnitude of the external stress, upon removal of the external stress the envelope returns to exactly the same certain fixed equilibrium position with respect to the girdling member.

In a particular case, each of the six pads was approximately 1 inch in diameter and one-sixteenth of an inch thick were utilized for bonding girdling member 26 to envelope 20.

Gas laser tube 18 is removably secured to laser tube mount support member 16 by screws 32, which fixedly attaches rigid girdling member 26 to member 16. When tube 18 is so secured to member 16, first Brewster window 22 thereof is so oriented with respect to the reflecting surface of first mirror 34, supported by first mirror mount 12, and second Brewster window 24 is so oriented with respect to second mirror 36, supported by second mirror mount 14, in such alignment that with envelope 20 of tube 18 in its certain fixed equilibrium position a gas discharge plasma within tube 18 will result in lasing being achieved.

Although not discussed up to now, a second small girdling member 38 may be attached to envelope 20 by pads of silicone rubber compound, in a manner similar to girdling member 26. Further, support member 40 and spring 42 may be utilized to provide some secondary support for tube 18 at girdling member 38 in order to eliminate the relatively large torque which would other wise be produced by the quite long portion of tube 18 extending to the right of girdling member 36. In addition, enclosure 44 is utilized between first Brewster angle window 22 and mirror 34 and enclosure 46 and bellows 48 is utilized between second Brewster angle window 24 and mirror 36 to keep relatively free of dust the regions between the Brewster angle windows and the respective mirrors corresponding thereto as well as the reflecting surfaces of the mirrors themselves. This prevents unwanted scattering and absorption of the light from the laser.

Although in the preferred embodiment of the invention illustrated in FIGS. 1, 2 and 3 of the drawing, both girdling members 26 and 38 are rings of circular configuration, this need not be the case. For instance the girdling member may have the shape of a polygon, such as a square, rectangle, hexagon, etc., or some other shape. Therefore, the term "circumferentially," as utilized in both the specification and the claims should be construed to cover girdling members of all types of parameter configurations, rather than solely a circular ring configuration. Also, the resilient adherent material could take the form of a solid ring, rather than a plurality of circumferentially spaced pads as shown in FIGS. 1, 2 and 3.

A laser mounted in accordance with the present invention may be factory tuned to optimum power before shipment, without being subject to detuning during shipment caused by movement of the discharge tube with respect to the mirror mounts in response to vibration and shock stresses received during shipment. Further, rotation of the laser tube, which results in a change of the output beam polarization is prevented. Also, the chance of breakage of frangible laser tube envelopes is minimized by the laser tube mount of the present invention.

What is claimed is:

1. In a gas laser assembly comprising a base member, a first mirror mount member secured to said base member toward one end thereof; a first mirror supported by said first mirror mount member in a first given position; a second mirror mount member secured to said base member toward the other end thereof; a second mirror supported by said first mirror mount member in a second given position; and a laser tube mount support member secured to said base member intermediate said first and second mirror mount members; the combination therewith of a laser tube removably secured to said laser tube mount support member; wherein said laser tube comprises an envelope terminated at each of opposite ends thereof in a Brewster angle window, and mounting means forming an integral part of said tube including a rigid girdling member disposed intermediate the ends of said tube which girdling member circumferentially surrounds said envelope and is in its entirety spaced from said envelope, and a plurality of circumferentially spaced pads of a resilient adherent material bonding and mechanically coupling said girdling member to said envelope to provide in the absence of external stress a certain fixed equilibrium position of said envelope with respect to said girdling member and in the presence of external stress a deviation of the position of said envelope from said certain fixed equilibrium position which depends upon the direction and magnitude of said external stress, said girdling member being removably but fixedly secured to said laser tube mount support member to orient said Brewster angle window at one end of said envelope with respect to said first given position of said first mirror and to orient said Brewster angle window at the other end of said envelope with respect to said second given position of said second mirror so that said first and second mirrors firm a resonant cavity for said tuve which is properly aligned to permit lasing to take place when said envelope of said tube has its certain fixed equilibrium position.

2. The gas laser tube defined in claim 1, wherein said envelope has a given longitudinal axis, and wherein said girdling member is a ring disposed in coaxial relationship with said given longitudinal axis of said envelope when in its certain fixed equilibrium position.

3. The gas laser tube defined in claim 1, wherein said material is a curable compound which is a liquid in its uncured stated and a solid in it cured state, and wherein the material forming each of said pads has been cured in place.

4. The gas laser tube defined in claim 3, wherein said material is a silicone rubber compound.

5. The gas laser tube defined in claim 1, wherein said envelope is frangible.

* * * * *

UNITED STATES PATENT OFFICE
CERTIFICATE OF CORRECTION

Patent No. 3,619,811      Dated Nov. 9, 1971

Inventor(s) Donald B. Kaiser and John A. Powell

It is certified that error appears in the above-identified patent and that said Letters Patent are hereby corrected as shown below:

Title Page - Abstract - line 1 "an" should read --as--

Column 1, line 36 - delete "a"

Column 4, line 20 - "firm" should read --form--

Column 4, line 20 - "tuve" should read --tube--

Column 4, line 30 - "stated" should read --state--

Signed and sealed this 27th day of June 1972.

(SEAL)
Attest:

EDWARD M. FLETCHER, JR.      ROBERT GOTTSCHALK
Attesting Officer      Commissioner of Patents